United States Patent
Cho et al.

(10) Patent No.: US 7,710,934 B2
(45) Date of Patent: May 4, 2010

(54) METHOD AND APPARATUS FOR KEEPING INFORMATION IN ROUTING TABLES CONSISTENT THROUGHOUT WIRELESS NETWORK

(75) Inventors: Song-yean Cho, Seoul (KR); Min-soo Kim, Seoul (KR); Ji-young Kong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1026 days.

(21) Appl. No.: 11/431,839

(22) Filed: May 11, 2006

(65) Prior Publication Data

US 2006/0256769 A1    Nov. 16, 2006

Related U.S. Application Data

(60) Provisional application No. 60/679,680, filed on May 11, 2005.

(30) Foreign Application Priority Data

Jul. 19, 2005    (KR)    ........................ 10-2005-0065331

(51) Int. Cl.
  *H04W 4/00*    (2009.01)
(52) U.S. Cl. ............... 370/338; 370/328; 370/331; 370/352; 370/401; 370/41.2; 370/436; 370/432.1; 370/410
(58) Field of Classification Search ............... 455/41.2, 455/432.1, 410–411, 436; 370/338, 328, 370/329, 331, 352, 401, 310
See application file for complete search history.

(56) References Cited

U.S. PATENT DOCUMENTS

| | | | | |
|---|---|---|---|---|
| 5,485,455 | A | * | 1/1996 | Dobbins et al. ............. 370/255 |
| 5,515,509 | A | * | 5/1996 | Rom ........................... 709/228 |
| 5,570,366 | A | | 10/1996 | Baker et al. |
| 5,594,731 | A | * | 1/1997 | Reissner ...................... 370/338 |
| 5,987,011 | A | * | 11/1999 | Toh ............................. 370/331 |
| 6,085,238 | A | * | 7/2000 | Yuasa et al. ................. 709/223 |
| 6,097,733 | A | * | 8/2000 | Basu et al. ................... 370/468 |
| 6,535,498 | B1 | * | 3/2003 | Larsson et al. ............. 370/338 |
| 6,728,232 | B2 | * | 4/2004 | Hasty et al. ................. 370/338 |
| 6,747,968 | B1 | * | 6/2004 | Seppala et al. ............. 370/338 |
| 6,795,857 | B1 | * | 9/2004 | Leung et al. ................ 709/224 |
| 6,831,921 | B2 | | 12/2004 | Higgins |

(Continued)

FOREIGN PATENT DOCUMENTS

CN    1458764 A    11/2003

(Continued)

OTHER PUBLICATIONS

Korean Office Action dated Nov. 24, 2006 issued in Korean Patent Application No. 10-2005-74853.

*Primary Examiner*—Sharad Rampuria
(74) *Attorney, Agent, or Firm*—Sughrue Mion, PLLC

(57) ABSTRACT

A method and apparatus for keeping information included in routing tables consistent throughout a wireless network are provided. The method includes enabling a mesh access point to generate data and transmit the data, gathering a plurality of pieces of information about a plurality of stations associated with the mesh access point, classifying the plurality of pieces of information into a plurality of blocks, generating a checksum for each of the blocks, and transmitting the checksum.

29 Claims, 9 Drawing Sheets

U.S. PATENT DOCUMENTS

| | | | |
|---|---|---|---|
| 6,870,822 B2* | 3/2005 | Balogh | 370/332 |
| 7,142,524 B2* | 11/2006 | Stanforth et al. | 370/328 |
| 7,177,594 B2* | 2/2007 | Burr | 455/41.2 |
| 7,190,672 B1* | 3/2007 | Whitehill | 370/235 |
| 7,251,238 B2* | 7/2007 | Joshi et al. | 370/338 |
| 7,266,104 B2* | 9/2007 | Belcea | 370/338 |
| 7,366,092 B2* | 4/2008 | Moll et al. | 370/218 |
| 7,433,691 B1* | 10/2008 | White | 455/445 |
| 7,502,354 B1* | 3/2009 | Maufer | 370/338 |
| 2001/0024953 A1* | 9/2001 | Balogh | 455/432 |
| 2002/0159409 A1* | 10/2002 | Wolfe et al. | 370/329 |
| 2003/0037167 A1 | 2/2003 | Garcia-Luna-Aceves et al. | |
| 2004/0156345 A1 | 8/2004 | Steer et al. | |
| 2004/0233855 A1* | 11/2004 | Gutierrez et al. | 370/252 |
| 2005/0074019 A1 | 4/2005 | Handforth et al. | |
| 2006/0126611 A1* | 6/2006 | Kelly et al. | 370/389 |
| 2008/0062941 A1* | 3/2008 | Rhee et al. | 370/338 |
| 2008/0224889 A1* | 9/2008 | Wyk et al. | 340/870.01 |

FOREIGN PATENT DOCUMENTS

| | | |
|---|---|---|
| KR | 10-2005-0001553 A | 1/2005 |
| WO | 2005/011312 A2 | 2/2005 |

* cited by examiner

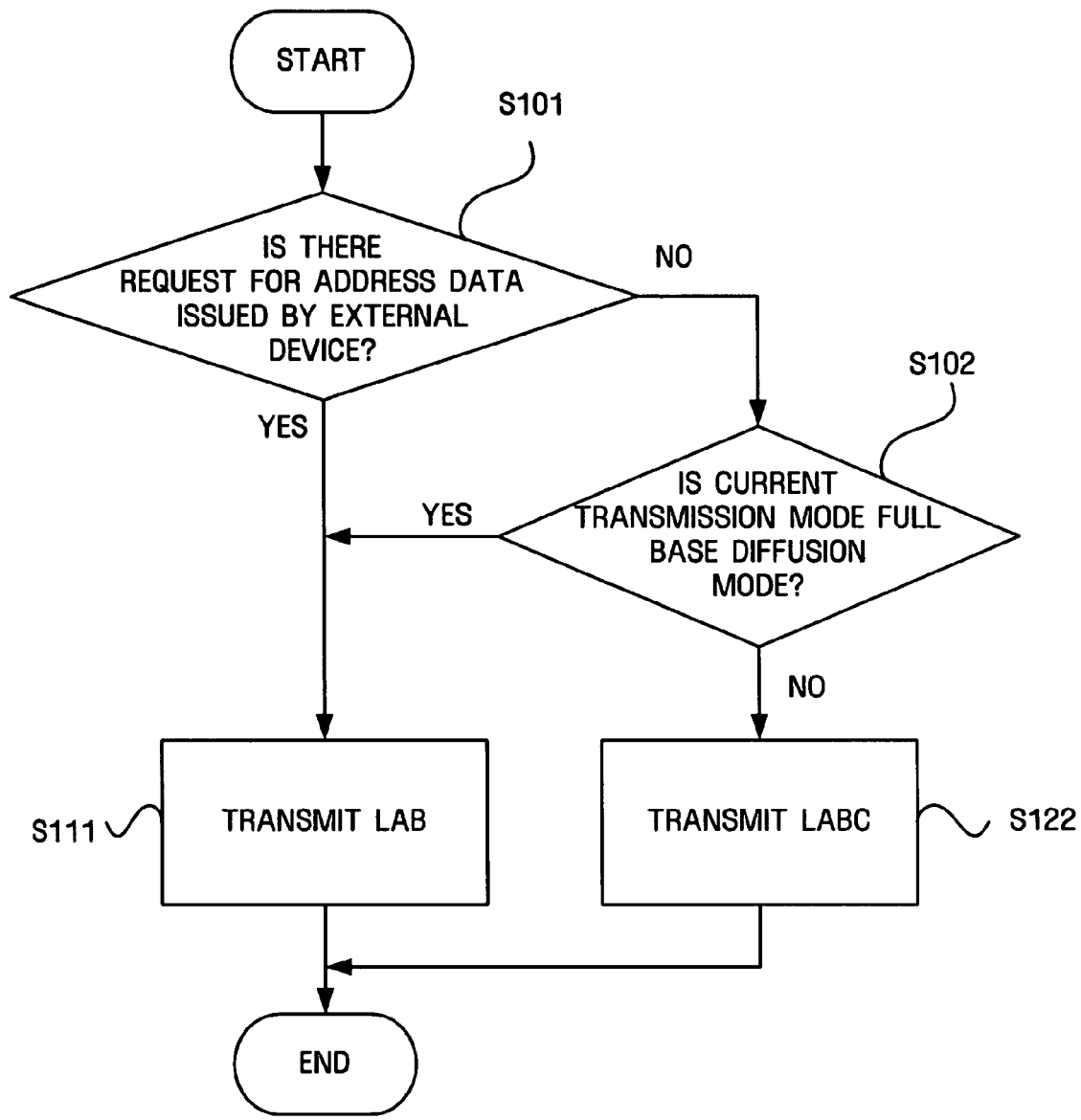

FIG.7

| BLOCK INDEX | MESH AP MAC ADDRESS | EXPIRATION TIME INFORMATION | |
|---|---|---|---|
| STATION ADDRESS || STATION SEQUENCE NUMBER | |
| STATION ADDRESS || STATION SEQUENCE NUMBER | GAT1(410) |
| ... ||| |
| BLOCK INDEX | MESH AP MAC ADDRESS | EXPIRATION TIME INFORMATION | |
| STATION ADDRESS || STATION SEQUENCE NUMBER | |
| STATION ADDRESS || STATION SEQUENCE NUMBER | GAT2(420) |
| ... ||| |
| BLOCK INDEX | MESH AP MAC ADDRESS | EXPIRATION TIME INFORMATION | |
| STATION ADDRESS || STATION SEQUENCE NUMBER | |
| STATION ADDRESS || STATION SEQUENCE NUMBER | GAT3(430) |
| ... ||| |

400

METHOD AND APPARATUS FOR KEEPING INFORMATION IN ROUTING TABLES CONSISTENT THROUGHOUT WIRELESS NETWORK

CROSS-REFERENCE TO RELATED APPLICATIONS

This application claims priority from Korean Patent Application No. 10-2005-0065331 filed on Jul. 19, 2005 in the Korean Intellectual Property Office, and U.S. Provisional Patent Application Ser. No. 60/679,680 filed on May 11, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to a wireless network, and more particularly, to a method and apparatus for keeping information in routing tables consistent throughout a wireless network.

2. Description of the Related Art

With the spread of Internet networks and the great increase in the amount of multimedia data transmitted via networks, the demand for high-speed communication networks has steadily increased. Regarding high-speed communication networks, a local area network (LAN) was developed in the late 1980s to have a transmission speed of 1-4 Mbps. A 100 Mbps Ethernet which is implemented based on a recent LAN standard is widely used. Recently, research has been vigorously conducted to develop a gigabit Ethernet. Various attempts to wirelessly access a network and carry out wireless network communication have expedited the research and development of wireless local area networks (WLAN), and thus, WLANs are now widespread. A WLAN provides lower data transmission rates and lower stability than a wired LAN. However, it is more convenient to establish a WLAN than to establish a wired LAN because a WLAN does not need wires, and a WLAN offers higher mobility than a wired LAN. Therefore, the demand for WLANs has steadily increased.

With the growing demand for increasing the amount of data transmitted over networks and recent developments in wireless data transmission technology, various improved versions of the IEEE 802.11 standard, such as the IEEE 802.11a, 802.11b, 802.11g, 802.11n, and 802.11s standards, have already been ratified or are expected to be ratified in the near future through standardization processes.

A device called an access point is used in a WLAN environment to provide LAN services to a wireless terminal. An access point performs almost the same functions as a hub in a wired LAN environment. The IEEE 802.11s standard defines a WLAN mesh, which is a LAN constituted by a plurality of access points, and enables the access points to wirelessly communicate with one another.

FIG. 1A is a diagram of a related wired LAN environment in which a plurality of access points are connected with one another by wires, and FIG. 1B is a diagram of a WLAN mesh environment which is established by a plurality of access points according to the 802.11s standard. In both the related wired LAN environment and the WLAN mesh environment, stations are wirelessly connected to an access point. However, in the related wired LAN environment of FIG. 1A, a plurality of access points AP1 through AP4 are connected to one another in a wired manner. Thus, routing information specifying which of the access points AP1 through AP4 each station is associated with is transmitted via wire. Therefore, the routing information is unlikely to be lost while being transmitted.

On the other hand, in the WLAN mesh environment of FIG. 1B, a plurality of access points AP1 through AP4 wirelessly communicate with one another. Each of the access points AP1 through AP4 transmits, via a wireless medium, information about a plurality of stations associated with the corresponding access point. For example, the access point AP1 may transmit its routing information to the access points AP2 and AP3, and the access point AP3 may transmit the routing information of the access point AP1 to the access point AP4. This type of data transmission among a plurality of access points is referred to as a multi-hop method. In the multi-hop method, if an intermediate access point between a sending access point and a receiving access point does not function correctly, it may not be able to receive data from the sending access point. For example, if the access point AP3 fails to receive the routing information of the access point AP1 due to instability of the wireless medium, the access point AP4 also may not be able to receive the routing information of the access point AP1. Therefore, it is more difficult to share a routing table in the WLAN mesh environment of FIG. 1B than in the wired LAN environment of FIG. 1A.

In short, a WLAN mesh environment is the same as a typical wireless network environment in that a plurality of wireless terminals are within the communication range of an access point and are thus controlled by the access point. However, in the WLAN mesh environment, unlike in the typical wired network environment, a plurality of access points wirelessly communicate with one another in a multi-hop manner. In order for a plurality of access points to wirelessly communicate with one another in a multi-hop manner, a wireless mesh routing protocol must be executed on Layer 2, i.e., on a link layer, and data paths to wireless terminals where the wireless mesh routing protocol cannot be executed must be secured while satisfying all the requirements prescribed in the IEEE 802.11 standard. Therefore, it is necessary to effectively transmit information about wireless terminals not having the wireless mesh routing protocol, i.e., legacy stations, over a network established between access points in a multi-hop method and to efficiently maintain the consistency of all station information stored in the access points. In particular, given that a wireless network environment is generally unstable and broadcast techniques used for distributing information over a wireless network are yet to be sufficiently reliable, some access points are highly likely to fail to receive information transmitted thereto. Therefore, it is necessary to develop a mechanism for detecting data loss during transmission of data between access points in a wireless network environment and updating data that is believed to be lost.

SUMMARY OF THE INVENTION

The present invention provides a method and apparatus for keeping information included in routing tables, which are necessary for establishing transmission paths in a wireless LAN mesh environment, consistent throughout the wireless LAN mesh environment.

The present invention also provides a method and apparatus for enhancing the efficiency of wirelessly transmitting information included in routing tables and keeping the information included in the routing tables consistent throughout a wireless LAN mesh environment.

The above stated aspects of the present invention will become clear to those skilled in the art upon review of the following description.

According to an aspect of the present invention, there is provided a method of keeping information included in routing tables consistent throughout a wireless network, the method comprising gathering a plurality of pieces of information about a plurality of stations associated with the mesh access point, classifying the plurality of pieces of information into a plurality of blocks, generating a checksum for each of the blocks, and transmitting the checksum.

According to another aspect of the present invention, there is provided a method of keeping information of routing tables consistent throughout a wireless network, the method including receiving checksum data corresponding a block from a wireless network, the block comprising station information, determining whether the received checksum data is identical to checksum data that was previously received, if the received checksum data is not identical to the previous checksum data, transmitting a request frame requesting transmission of data of the block to an access point that previously sent the received checksum data, and receiving the data of the block from the access point and reflecting the received data in a routing table.

According to still another aspect of the present invention, there is provided a method of keeping information included in routing tables consistent throughout a wireless network, the method comprising receiving data of a block from a wireless network, the block comprising station information, receiving checksum data corresponding to the block from the wireless network, determining whether the data of the block has changed based on the received checksum data, if the data of the block is determined to have changed, transmitting a request frame requesting the changed data of the block to an access point that previously generated and sent the original data of the block, and receiving the changed data of the block from the access point and reflecting the received data in a routing table.

According to a further aspect of the present invention, there is provided an access point comprising a local association base (LAB) generation unit which gathers a plurality of pieces of information about a plurality of stations associated with the access point and generates a LAB by classifying the plurality of pieces of information into a plurality of blocks, a local association base checksum (LABC) generation unit which generates a LABC by generating checksum data for each of the blocks, a hash unit which provides a hash function or a hash table necessary for generating the checksum data, and a transmission unit which transmits the LAB or the LABC.

According to yet another aspect of the present invention, there is provided a wireless network device comprising a reception unit which receives data of a block or checksum data corresponding to the block from a wireless network, the block comprising station information, a global association base (GAB) generation unit which generates a GAB based on the received block data, a hash unit which determines whether the received checksum data is identical to checksum data that is included in the generated GAB and corresponds to the block, and a routing table which comprises station association information obtained by the GAB generation unit.

BRIEF DESCRIPTION OF THE DRAWINGS

The above aspects of the present invention will become more apparent by describing in detail exemplary embodiments thereof with reference to the attached drawings in which:

FIG. 2 is a flowchart explaining the transmission of station association information by a mesh access point according to an exemplary embodiment of the present invention;

FIG. 7 is a diagram explaining the format of a GAB comprising all information about a plurality of stations associated with a wireless network, according to an exemplary embodiment of the present invention.

DETAILED DESCRIPTION OF THE INVENTION

Figure 1A:
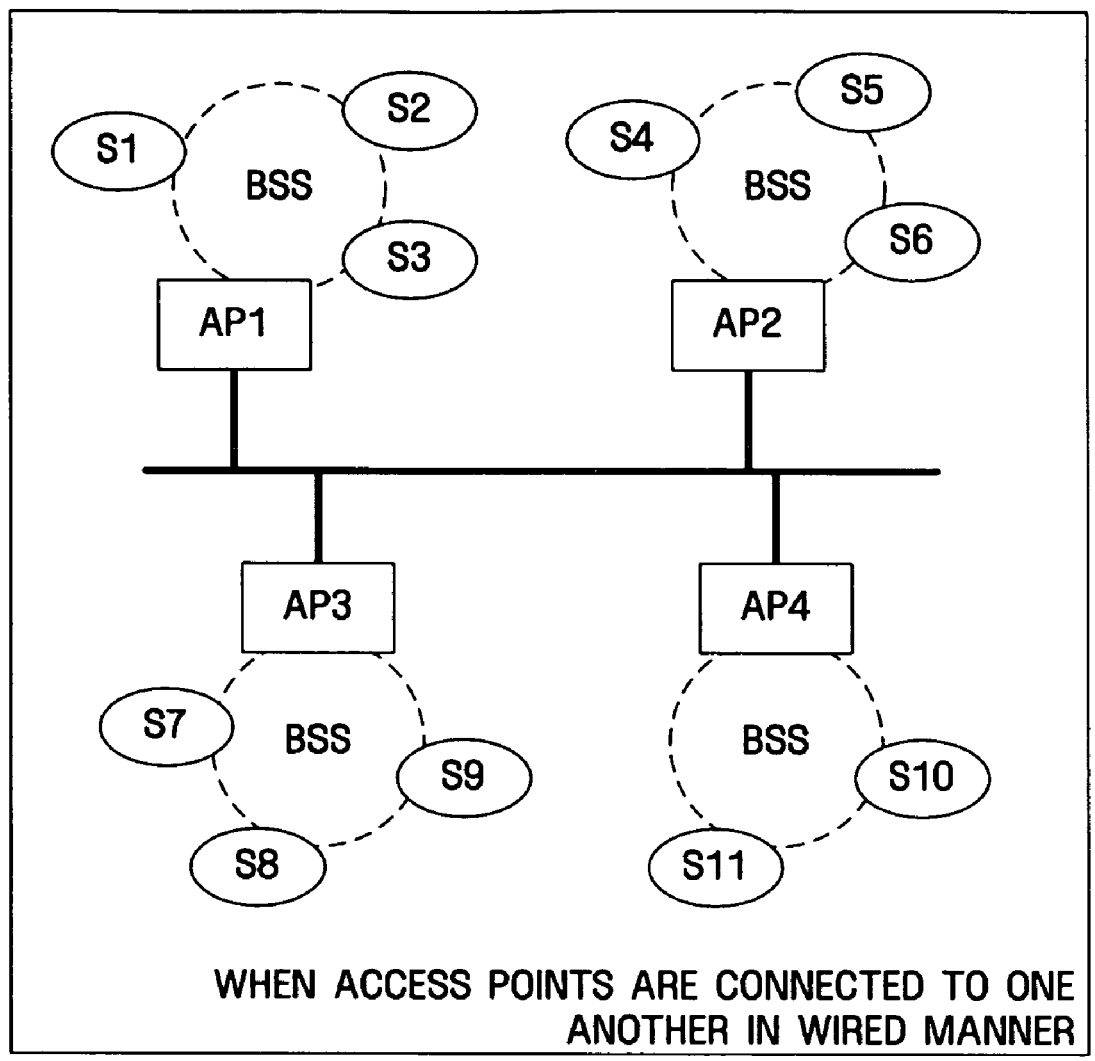
FIG. 1A is a diagram of a related wired network in which a plurality of access points are connected with one another by wires.
Figure 1B:
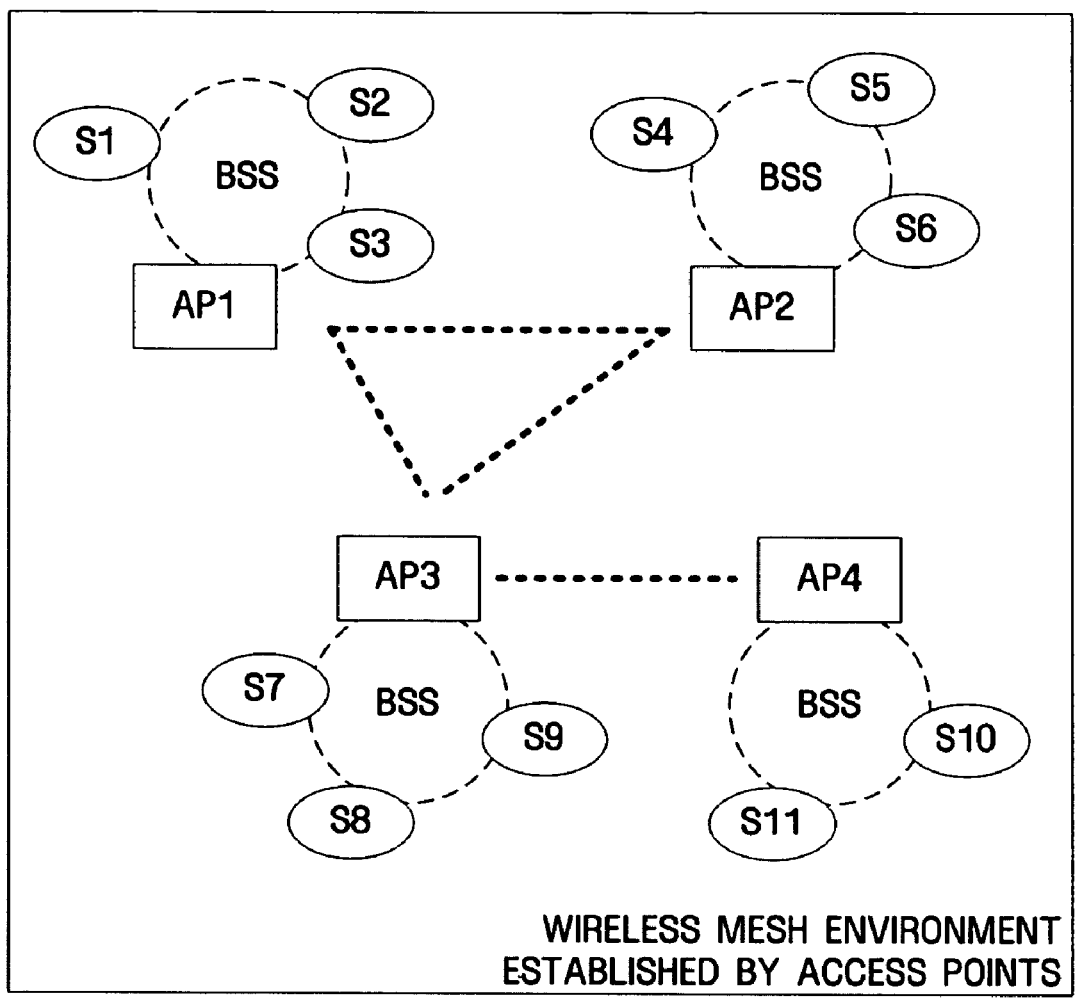
FIG. 1B is a diagram of a wireless LAN mesh constituted by a plurality of access points according to the 802.11s standard.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Reference numerals used for elements are used consistently throughout the specification.

The present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

A wireless LAN mesh comprises a legacy 802.11 station, a mesh point, and a mesh access point. A legacy station cannot support the confirmation of a WLAN mesh. Therefore, a legacy station determines a mesh path with the aid of a mesh access point and transmits data frames via the mesh path.

Terms used often throughout this specification will be briefly defined.

A local Association Base (LAB) is a table listing stations and their associated mesh access points;

A global association base (GAB) is a list of stations associated with each of a plurality of mesh access points in a WLAN mesh and can be established by collecting LABs transmitted by the respective mesh access points; and A checksum, particularly, a LAB checksum, is a result of applying a hash function to LAB information.

A mesh access point maintains information including the addresses of stations associated with the mesh access point. This information comprises a LAB and LABC. A LAB includes all information about the stations associated with the mesh access point and is transmitted to stations associated with other mesh access points. A LABC comprises checksum results obtained by applying a hash function or a conversion function to the LAB. Therefore, the LABC is smaller than the LAB. The LABC is transmitted to a mesh access point or a station that previously received the LAB from a predetermined mesh access point. Therefore, it is possible for the mesh access point or the station receiving the LABC to determine whether there is a station associated with or disassociated from the predetermined mesh access point by comparing the received LABC with LABC that was previously received.

FIG. 2 is a flowchart for explaining the transmission of station association information by a mesh access point according to an exemplary embodiment of the present invention.

Referring to the method of FIG. 2, a predetermined mesh access point can maintain the addresses of stations associated with the predetermined mesh access point. If a station associated with a mesh access point other than the predetermined mesh access point requests information of the stations associated with the predetermined mesh access point or if the predetermined mesh access point determines that there is a need to transmit the information about the stations associated with the predetermined mesh access point to other mesh access points according to a predefined schedule maintained by the predetermined mesh schedule, the predetermined mesh access point may need to determine what data is to be transmitted based on the circumstances facing the predetermined mesh access point.

In operation S101, a predetermined mesh access point determines whether address data has been requested by a mesh access point (hereinafter referred to as an external mesh access point) other than the predetermined mesh access point or a station (hereinafter referred to as the external station) associated with a mesh access point other than the predetermined mesh access point. The address data of the predetermined mesh access point may be requested by an external mesh access point or an external station when the external mesh access point or the external station does not address data of its own or determines based on a checksum that its address data, if any, does not match the address data of the predetermined mesh access point. Therefore, if a request for the address data of the predetermined mesh access point is determined to have been issued, the predetermined mesh access point transmits not LABC but an entire LAB to the external mesh access point or the external station in operation S111. If no request for the address data of the predetermined mesh access point has ever been issued, it is determined that the predetermined mesh access point attempts to transmit data to the external mesh point or the external station according to a predefined schedule, and the method proceeds to operation S102. The predetermined mesh access point may periodically transmit all or some of the information about the stations associated with the predetermined mesh access point depending on whether a current transmission mode is a full base diffusion mode in which all the information about the stations associated with the predetermined mesh access point needs to be transmitted or a checksum base diffusion mode in which only checksum data corresponding to the stations associated with the predetermined mesh access point needs to be transmitted. If the current transmission mode is the full base diffusion mode, the predetermined mesh access point transmits the LAB, which comprises all the information about the stations associated with the predetermined mesh access point, in operation S111. However, if the current transmission mode is the checksum base diffusion mode, the predetermined mesh access point transmits checksum values of the LAB, i.e., the LABC, in operation S122. Since the LABC is smaller than the LAB, a scheduling operation may be performed so that the transmission of the LABC can be carried out more frequently than the transmission of the LAB.

The checksum data described above with reference to FIG. 2 may be checksum data corresponding to the LAB. The format of the LAB will now be described in detail with reference to FIG. 3.

Figure 3:
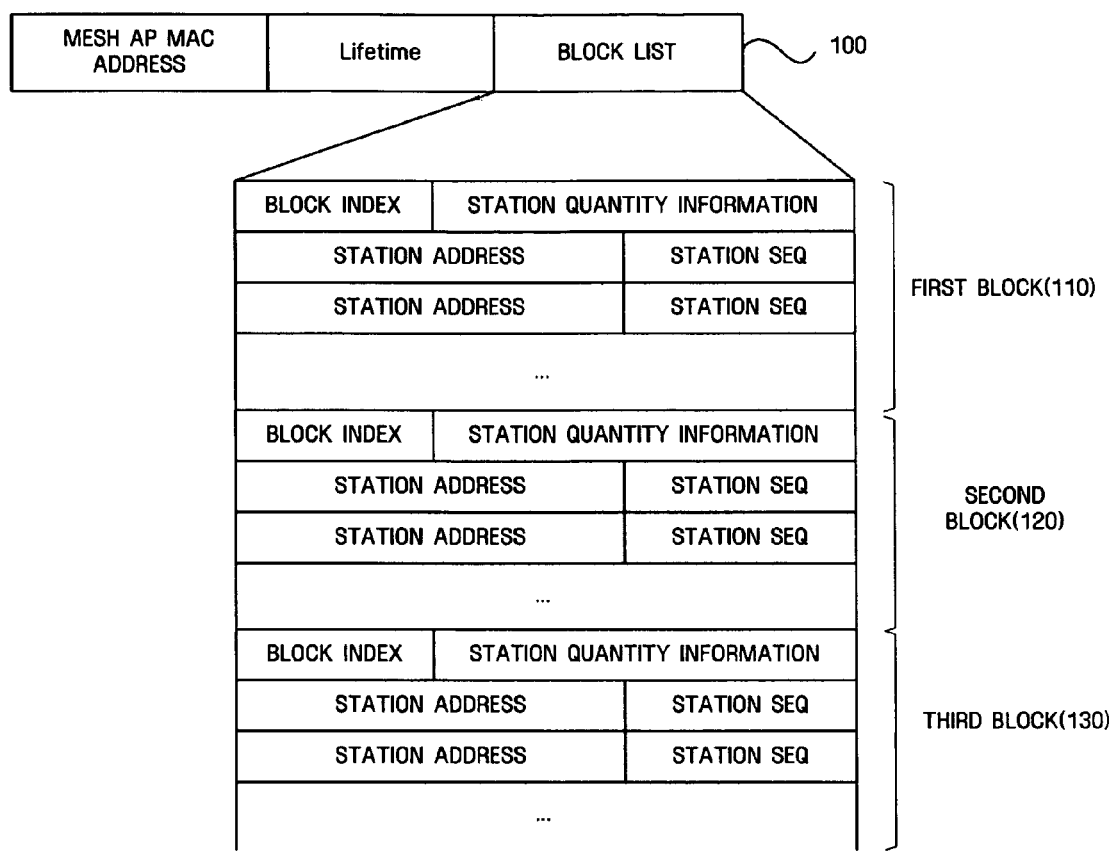
FIG. 3 is a diagram explaining the format of a LAB according to an exemplary embodiment of the present invention.

FIG. 3 is a diagram for explaining the format of a local association base (LAB) according to an exemplary embodiment of the present invention. Referring to FIG. 3, a LAB 100 comprises a MAC address of a predetermined mesh access point, lifetime information specifying a period of time for which the LAB 100 is valid, and a block list including a plurality of first through N-th blocks 110 through 130. The block list also includes a plurality of block indexes for the respective blocks 110 through 130 and a plurality of pieces of station quantity information corresponding to the respective blocks 110 through 130 wherein the piece of station information in each block specifies the number of stations whose information is stored in the block.

Each of the blocks 110 through 130 maintains information about one or more stations. In FIG. 3, the addresses and sequence numbers of stations associated with the predetermined mesh access point are maintained in units of the blocks 110 through 130. Therefore, when station information included in one of the blocks 110 through 130 is modified, not all the station information included in each of the blocks 110 through 130 but only the modified station information is transmitted.

The station addresses included in the blocks 110 through 130 may be the MAC addresses of the stations associated with the predetermined mesh access point. A station's MAC address and sequence number are referred to as a local association tuple (LAT). Each of the blocks 110 through 130 comprises a block index, a piece of station quantity information specifying the number of stations whose information is stored in the corresponding block (i.e., a piece of LAT quantity information), and one or more LATs. A station's sequence number may be a serial number required for managing a frame to associate/disassociate the station with/from the predetermined mesh access point. In a case where a plurality of sequence numbers are allotted to a plurality of stations according to the basic format of 802.11 management frames, it is possible to determine the order in which the stations have been associated with, for example, the predetermined mesh access point. In this case, a station with the highest sequence number is determined to have been most recently associated with the predetermined mesh access point.

In short, since, in the present exemplary embodiment, information about a plurality of stations associated with a mesh access point is managed in units of blocks, it is possible to enhance the efficiency of a network because, even when there are modifications made to the station information, not all the station information but the modified station information needs to be transmitted. In addition, it is possible for the mesh access point to periodically transmit the station information.

Figure 4:
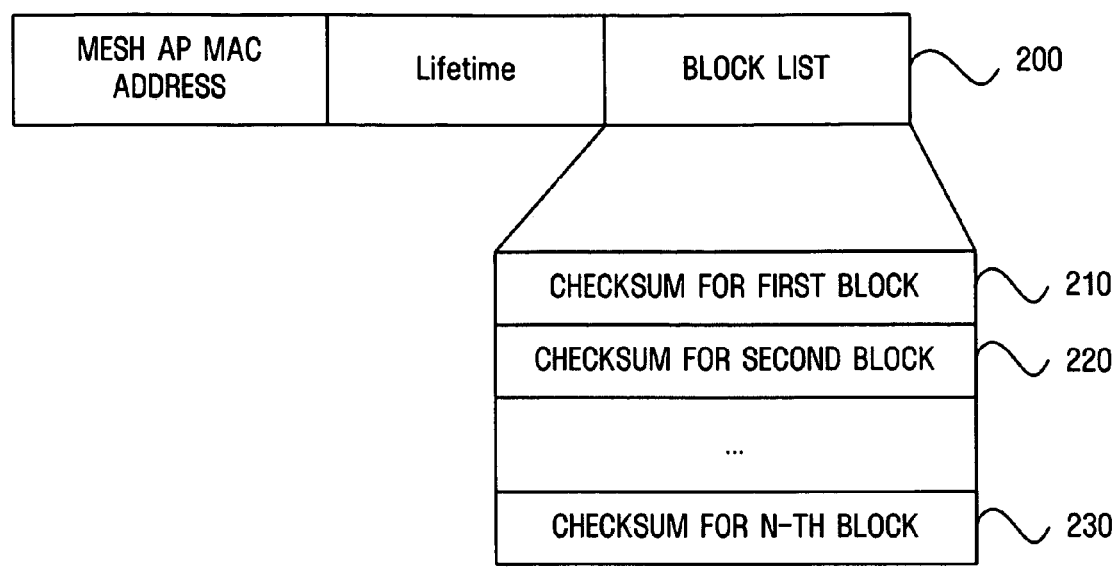
FIG. 4 is a diagram explaining the format of a LABC according to an exemplary embodiment of the present invention.

FIG. 4 is a diagram for explaining the format of a local association base checksum (LABC) according to an exemplary embodiment of the present invention. LABC 200, like the LAB 100 of FIG. 3, comprises the MAC address of the predetermined mesh access point, lifetime information, and a block list. The block list includes a plurality of first through N-th checksum data 210 through 230 for the first through N-th blocks 110 through 130, respectively, of the LAB 100. Therefore, if one of the stations listed in the first block 110 is disassociated with the predetermined mesh access point so that the station information stored in the first block 110 changes, the first checksum data 210 corresponding to the first block 110 changes.

The predetermined mesh access point may periodically transmit the LABC 200 including the first through N-th checksum data 210 through 230 to an external station or an external mesh access point. If the external station or the external mesh access point determines that it has different checksum data from the first through N-th checksum data 210 through 230 of the LABC 200, it may issue a request for retransmission of station information corresponding to the block of the LAB 100 whose checksum data is different from the checksum data of the external station or the external mesh access point. Then, the predetermined mesh access point may transmit the station information corresponding to all the blocks 110 through 130 or the station information corresponding to only the block whose checksum data is different from the checksum data of the external station or the external mesh access point. Therefore, it is possible to reduce the amount of data transmitted over networks to keep station information consistent throughout the network and enhance the efficiency of the network.

Hash values obtained using a hash function or a hash table may be used as checksum data. Alternatively, data obtained through compression or conversion may be used as checksum data.

Figure 5:
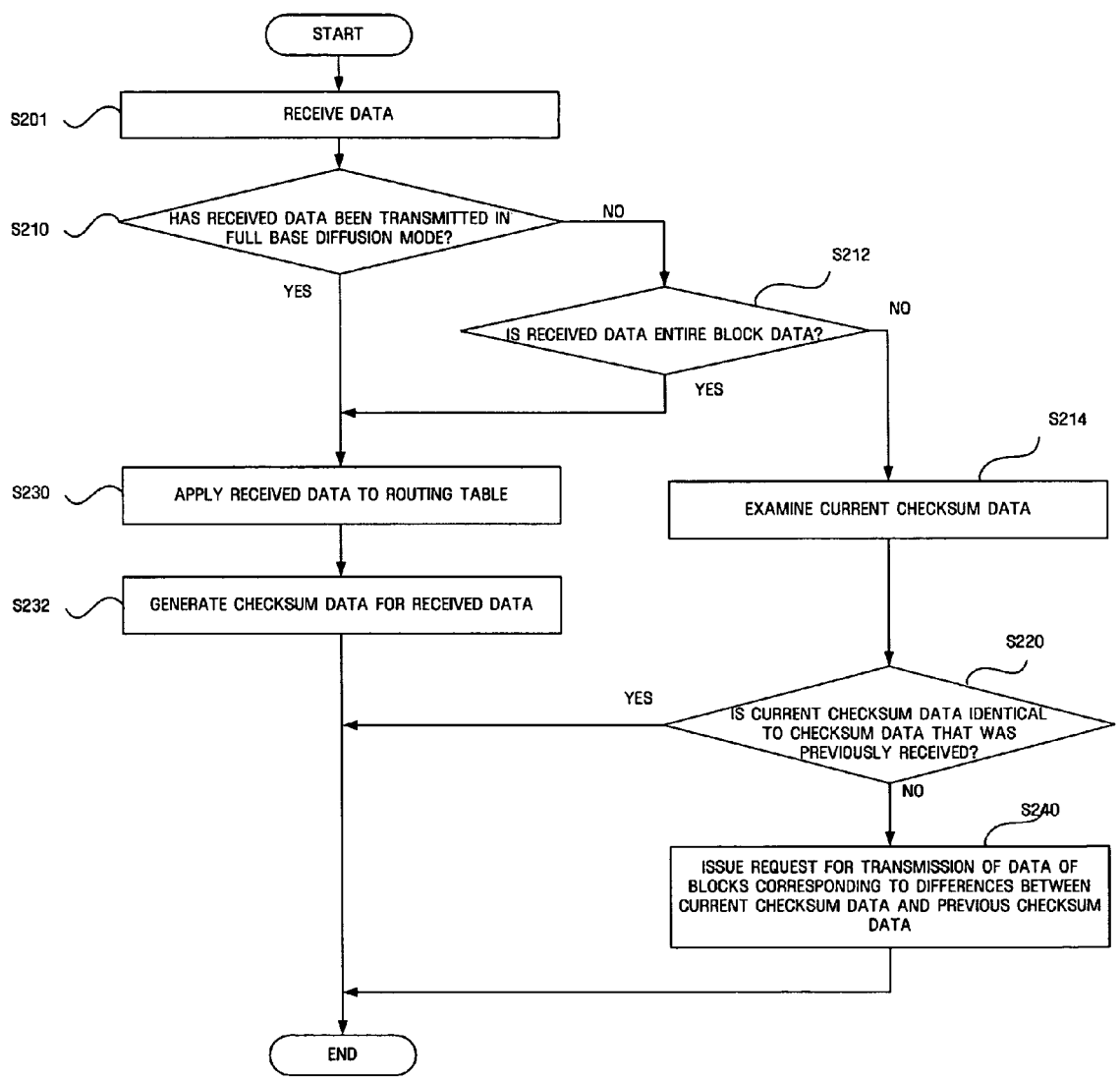
FIG. 5 is a flowchart explaining the generation of a routing table based on a LAB and LABC by a mesh access point or a station according to an exemplary embodiment of the present invention.

FIG. 5 is a flowchart for explaining the generation of a routing table based on a LAB and LABC by a mesh access point or a station according to an exemplary embodiment of the present invention. In operation S201, data is received. In operation S210, it is determined whether the received data has been transmitted in a full base diffusion mode by a predetermined mesh access point. In operation S230, if the received data is determined in operation S210 to have been transmitted in the full base diffusion mode, it appears that the received data is a LAB including information about all stations associated with the predetermined mesh access point, and thus, the received data is applied to a routing table. In operation S212, if the received data is determined in operation S210 to have been transmitted in a different mode than the full base diffusion mode, it is determined whether the received data corresponds to part of the LAB, particularly, a block of the LAB, or checksum data. If the received data is determined in operation S212 to be a block of the LAB, it appears that an external station or an external mesh point receiving data from the mesh access point in operation S210 has received the LABC from the predetermined mesh access point, has determined that its checksum data for a block of the LAB differs from the LABC and thus has issued a request for retransmission of the block of the LAB. When the status of a station listed in a predetermined block of the LAB changes, the predetermined mesh access point may decide to transmit only data of the predetermined block to the external station or the external mesh access point. Therefore, in a case where the received data is data of a block of the LAB transmitted by the predetermined mesh access point, the received data can also be applied to the routing table in operation S230. Thereafter, in operation S232, checksum data for the block corresponding to the received data is generated so that it can be compared later with checksum data to be transmitted by the predetermined mesh access point. The generation of the checksum data in operation S232 may be carried out using a hash function or a hash table.

In operation S214, if it is determined in operation S212 that the received data is checksum data, the received data is examined by comparing it with checksum data that was previously received. If the received data is identical to the previous checksum data, it appears that the status of stations listed in a block corresponding to the received data has not changed. However, if the received data is not identical to the previous checksum data, it appears that station information has changed because the status of the stations listed in the block corresponding to the received data has changed. Therefore, in operation S240, a request for transmission of all data regarding the block corresponding to the received data is issued to the predetermined mesh access point. If the predetermined mesh access point transmits the data regarding the block corresponding to the received data in response to the request issued in operation S240, the same operations as operations S212, S230, and S232 can be carried out.

The predetermined mesh access point may transmit expired checksum data or expired LABs. Referring to FIG. 3 or 4, a LAB or a LABC contains lifetime information specifying when the LAB or the LABC will expire. Therefore, a LABC or a LAB may not be valid any longer after its expiration date. Thus, a station or a mesh access point receiving an expired LABC or an expired LAB may issue a request for retransmission of a non-expired LABC or a non-expired LAB to the predetermined mesh access point. The method illustrated in FIG. 5 may be carried out by various types of wireless network devices, such as mesh access points or mesh points, as long as the wireless network devices can generate and maintain a routing table.

Figure 6:
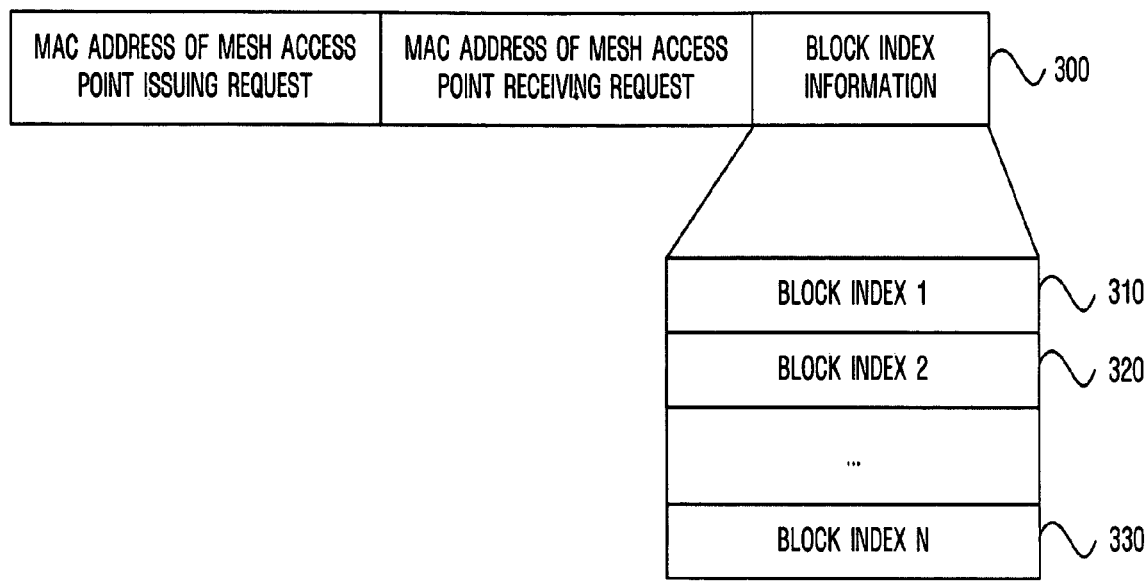
FIG. 6 is a diagram explaining the format of a block transmission request frame according to an exemplary embodiment of the present invention.

FIG. 6 is a diagram for explaining the format of a block transmission request frame according to an exemplary embodiment of the present invention. A block transmission request frame 300 is a frame used for a receiving mesh access point or a receiving station to issue a request for retransmission of data regarding predetermined blocks to a sending mesh access point if current checksum data corresponding to the predetermined blocks is different from previous checksum data corresponding to the predetermined blocks. The block transmission request frame 300 includes the MAC address of the receiving mesh access point or the receiving station, the MAC address of the sending mesh access point, and a list of a plurality of first through N-th block indexes 310 through 330 corresponding to the blocks requested by the receiving mesh access point or the receiving station.

FIG. 7 is a diagram for explaining the format of a global association base (GAB) comprising all information about a plurality of stations associated with a wireless network, according to an exemplary embodiment of the present invention. A GAB 400 is a collection of a plurality of pieces of station association information gathered from LABs. The GAB 400 comprises a plurality of first through third global association tuples (GATs) 410 through 430. Each of the first through third GATs includes a block index, a plurality of stations associated with a predetermined mesh access point, the MAC address of the predetermined mesh access point, expiration time information, and the addresses and sequence numbers of the stations associated with the predetermined mesh access point.

In detail, the first GAT 410 includes a block index corresponding to a block including a group of stations associated with the predetermined mesh access point, the MAC address of the predetermined mesh access point, and expiration time information specifying when the first GAT 410 expires. An example of an expiration time specified in the expiration time information may be a result of adding a current time to a lifetime specified in a received LAB or LABC.

The first GAT 410 also includes the MAC addresses and sequence numbers of the group of stations associated with the predetermined mesh access point. The sequence numbers of the group of stations associated with the predetermined mesh access point may be serial numbers used for managing a frame transmitted when a station other than the group of stations is associated with the predetermined mesh access point or when any of the group of stations is disassociated from the predetermined mesh access point.

The GAB 400 is maintained by an external access point or an external mesh point station. Thus, when the external access point or the external mesh point station receives checksum data from the predetermined mesh access point, it compares the received checksum data with the GAB 400 and determines whether the status of stations included in the received checksum data has changed based on the comparison results.

According to the determination results, the received checksum data may be added to the GAB 400. In detail, checksum data generated using a hash function or a hash table may be added to the GAB 400 and may be compared with checksum data transmitted later by the predetermined mesh access point, thereby making it possible to determine whether the statuses of stations corresponding to the checksum data transmitted by the predetermined mesh access point have changed. In addition, whenever checksum data is received from the predetermined mesh access point, the external access point or the external mesh point station may generate checksum data for one or more blocks corresponding to the received checksum data and compare the generated checksum data with the received checksum data.

The external mesh access point or the external mesh point station may be able to perform a routing operation using the GAB 400. In detail, the external mesh access point or the external mesh point station can determine what mesh access point a station of interest is associated with based on the GAB 400. Thereafter, the external mesh access point or the external mesh point station transmits data to the mesh access point that the station of interest is determined to be associated with so that the data can be transmitted to the station of interest.

In the GAB 400, a single station may be included in more than one GAT. For example, assuming that a first station currently associated with a first mesh access point moves and is thus associated with a second mesh access point and that not information specifying the disassociation of the first station from the first mesh access point but information specifying the association of the first station with the second mesh access point is reflected in the GAB 400, the GAB 400 may indicate that the first station is associated with both the first and second mesh access points. In this case, it may be determined whether the first station is associated with the first or second mesh access point based on sequence numbers corresponding to the GATs to which the first station belongs. In other words, of the sequence numbers, the highest sequence number is considered to be the most recent sequence number, and thus, the first station is determined to be associated with a mesh access point corresponding to the highest sequence number. Thereafter, data to be transmitted to the first station may be routed to the mesh access point corresponding to the highest sequence number.

When a station is disassociated with a predetermined mesh access point and the predetermined mesh access point announces the disassociation of the station therefrom using a LAB, information about the station may be deleted from the GAB 400. In addition, the information about the station may be deleted when a GAT of the GAB 400 corresponding to the station is modified with reference to the LAB.

When managing the GAB 400 and a routing table separately from each other, the deletion of information from the routing table, the modification of information stored in the routing table, and/or the addition of information to the routing table may be performed while updating the GAB 400.

In the embodiments of the present invention described below, a "unit", "part" or a "module" indicates a software component or a hardware component such as a field-programmable gate array (FPGA) or an application-specific integrated circuit (ASIC). The unit performs a particular function but is not restricted to software and hardware. The unit may be included in an addressable storage medium or may be configured to play one or more processors. Accordingly, units may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by units may be combined into a smaller number of components and a smaller number of units, or may be divided into a greater number of components and a greater number of units. In addition, components and units may be implemented such that they play one or more central processing units (CPUs) in a device or a secure MMC.

Figure 8:
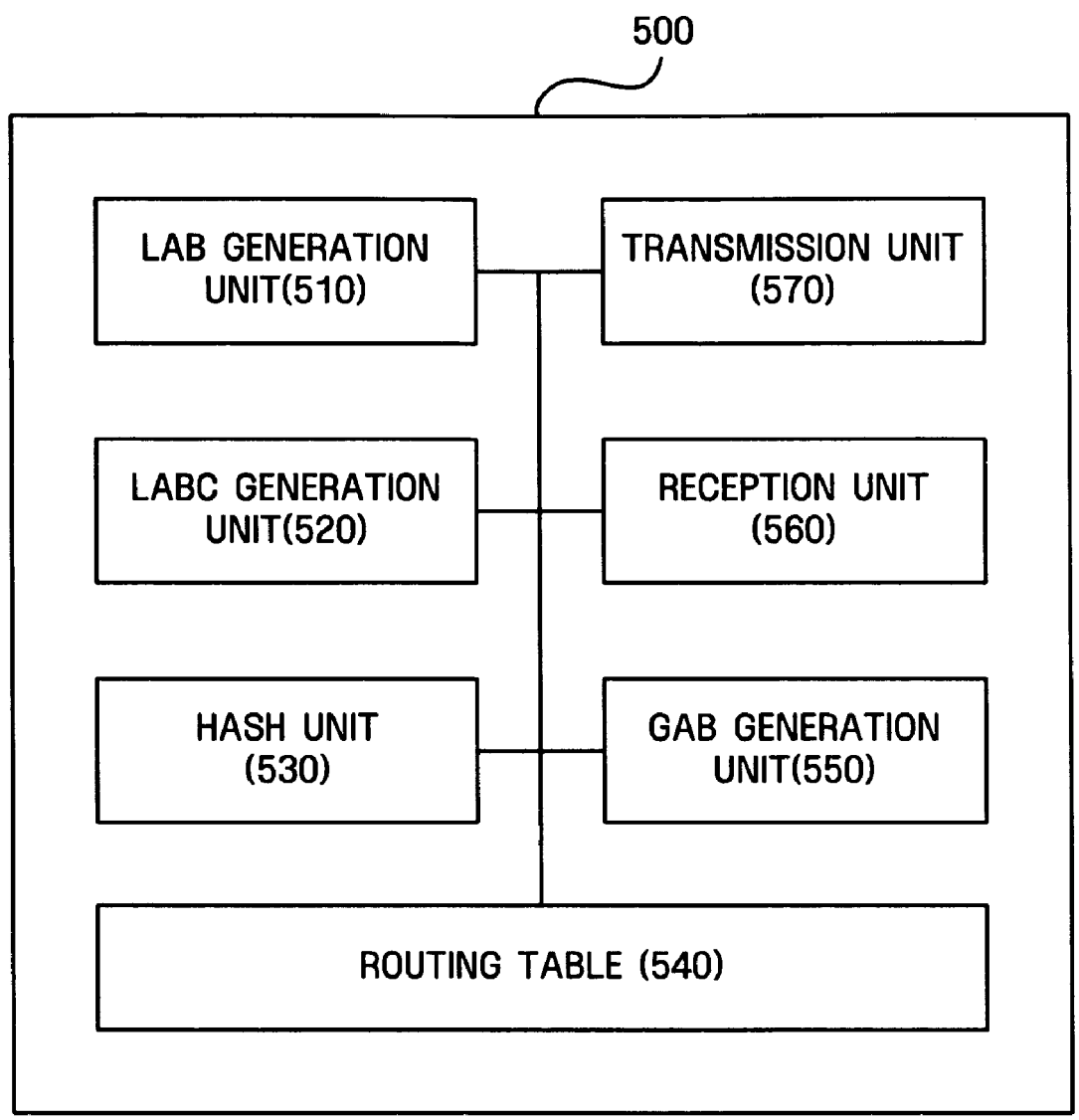
FIG. 8 is a block diagram of a mesh access point according to an exemplary embodiment of the present invention.

FIG. 8 is a block diagram of a mesh access point according to an exemplary embodiment of the present invention.

A mesh access point 500 according to an exemplary embodiment of the present invention generates a LAB and a LABC based on a plurality of pieces of information about a plurality of stations associated with the mesh access point 500 and transmits the LAB and the LABC. In addition, the mesh access point 500 receives a plurality of pieces of information about a plurality of stations associated with another mesh access point and generates and manages a GAB and a routing table based on the plurality of pieces of information. A mesh point, like the mesh access point 500, may receive a LAB and a LABC and generate a GAB and a routing table based on the received LAB or LABC.

In detail, a LAB generation unit 510 generates a LAB. The LAB may include a plurality of blocks, and each of the blocks includes a block index, the MAC addresses and sequence numbers of a group of a plurality of stations associated with the mesh access point 500, and station quantity information, as illustrated in FIG. 3. The LAB generation unit 510 may modify the LAB in units of the blocks or generate a new LAB and transmit the modified LAB or the new LAB when a station other than the stations listed in the LAB is associated with the mesh access point 500 or when one of the stations listed in the LAB is disassociated with the mesh access point 500. If the LAB is too large to be transmitted at a time, it may be transmitted in units of the blocks.

A LABC generation unit 520 generates a LABC comprising checksum data corresponding to each of the blocks of the LAB generated by the LAB generation unit 510 and transmits the LABC. The checksum data for each of the blocks of the LAB may be generated by a hash unit 530. An example of the LABC is illustrated in FIG. 4. If the LABC is too large to be transmitted at a time, it may be transmitted in units of the blocks of the LAB.

The hash unit 530 generates checksum data by converting data of the blocks of the LAB into data of a smaller size than the data of the blocks of the LAB using a hash function, a hash table, a conversion function, and a compression function. In other words, the hash function 530 converts each of the blocks of the LAB generated by the LAB generation unit 510 into checksum data. The checksum data is much smaller than the blocks of the LAB, and thus, data loss may be inevitable during the conversion of each of the blocks of the LAB into the checksum. Therefore, different blocks of the LAB may be converted into the same checksum data. Before transmitting the checksum data generated by the hash function 530, time information specifying until when the checksum data is valid, such as lifetime information, may be set in the checksum data. The hash unit 530 may also be used for examining a LABC received by a GAB generation unit 550 regarding a mesh access point other than the mesh access point 500.

A transmission unit 570 transmits data, e.g., the LAB generated by the LAB generation unit 510 or the LABC generated by the LABC generation unit 520, over a wireless network. In addition, the transmission unit 570 may transmit a request frame requesting transmission of data of a predetermined block to a mesh access point other than the mesh access point 500.

The LAB generation unit 510, the LABC generation unit 520, the hash unit 530, and the transmission unit 570 may perform predetermined functions to gather all information about the stations associated with the mesh access point 500 and thus to provide information necessary for a mesh access point other than the mesh access point 500 to generate a routing table. However, the mesh access point 500 may need to receive station information from another mesh access point 500 and generate its own routing table based on the received information.

For this, a reception unit 560 receives data, e.g., a LAB or a LABC, from a mesh access point other than the mesh access point 500 over the wireless network. In addition, the reception unit 560 may receive a request frame requesting a predetermined block transmitted by a mesh access point other than the mesh access point 500.

A GAB generation unit 550 generates a GAB. The GAB comprises information about a plurality of stations associated with the wireless network, which is of a mesh type. A routing table 540 stores information specifying what APs in the wireless network stations are associated with and is thus referenced to transmit data to a station associated with an AP other than the mesh access point 500. The routing table 540 may be maintained using the GAB generated by the GAB generation unit 550. The GAB is obtained by gathering a plurality of LABs received by the reception unit 560. An example of the GAB is illustrated in FIG. 7. It may be determined whether each of a plurality of GATs of the GAB is valid by comparing the GAB with LABC data received by the reception unit 560.

When generating a GAT, the GAB generation unit 550 may compare checksum data generated in advance by the hash unit 530 with received LABC. Alternatively, the GAB generation unit 550 may generate checksum data for each GAT whenever LABC data is received and compare the checksum data with the received LABC data.

The routing table 540 is used for determining what AP each of a plurality of stations listed in the GAB generated by the GAB generation unit 550 is associated with. In order to transmit data to a predetermined station, the data can be transmitted to a mesh access point that the predetermined station is associated with. When a station is newly associated with a predetermined mesh access point listed in the GAB generated by the GAB generation unit 550 or when one of a plurality of stations associated with the predetermined mesh access point is disassociated from the predetermined mesh access point, information indicating this association or disassociation is reflected in the routing table 540, thereby enabling a communication path to the to be established in the wireless network.

According to the present invention, it is possible to maintain the consistency of information included in routing tables referenced when setting communication paths in a wireless mesh environment.

In addition, according to the present invention, it is possible to enhance the efficiency and consistency of the wireless mesh environment by transmitting only part of the information included in the routing tables, instead of transmitting all the information included in the routing tables.

It will be apparent to those skilled in the art that various modifications and changes may be made thereto without departing from the scope and spirit of the invention. Therefore, it should be understood that the above exemplary embodiment is not restrictive but illustrative in all aspects. The scope of the present invention is defined by the appended claims rather than the detailed description of the invention. All modifications and changes derived from the scope and spirit of the claims and equivalents thereof should be construed to be included in the scope of the present invention.

What is claimed is:

1. A method of keeping information included in routing tables consistent throughout a wireless network, the method comprising:
   gathering information in a local association base (LAB) about a plurality of stations associated with a mesh access point;
   classifying the information into a plurality of blocks of the local association base (LAB);

generating a local association base checksum (LABC) for each of the blocks;

transmitting the local association base checksum (LABC), providing a hash function or a hash table necessary for generating the local association base checksum (LABC).

2. The method of claim 1, wherein the information comprises MAC addresses and sequence numbers of the plurality of stations associated with the mesh access point.

3. The method of claim 1, wherein the checksum is obtained using a hash function or a hash table.

4. The method of claim 1, wherein the wireless network is established based on the 802.11s protocol.

5. The method of claim 1, wherein the transmission comprises transmitting the checksum at regular time intervals.

6. The method of claim 1, further comprising, if a station associated with the mesh access point or if one of the stations of the plurality of stations currently associated with the mesh access point is disassociated with the mesh access point, transmitting data of a block comprising information about the associated or disassociated station.

7. The method of claim 1, further comprising keeping the information included in the routing tables consistent throughout the wireless network after the classification.

8. A method of keeping information included in routing tables consistent throughout a wireless network, the method comprising:

receiving local association base checksum (LABC) data corresponding to a block in a local association base (LAB) from a wireless network, the block comprising station information;

determining whether the received local association base checksum (LABC) data is identical to local association base checksum (LABC) data previously received;

if the received local association base checksum (LABC) data is not identical to the previously received local association base checksum (LABC) data, transmitting a request frame to an access point that previously sent the received local association base checksum (LABC) data requesting transmission of data of the block; and receiving the data of the block from the access point and storing the received data in a routing table, providing a hash function or a hash table necessary for generating the local association base checksum (LABC) data.

9. The method of claim 8, further comprising generating checksum data for the block after the storing of the received data in the routing table.

10. The method of claim 8, wherein the data of the block comprises MAC addresses and sequence numbers of a plurality of stations associated with the access point.

11. The method of claim 8, wherein the request frame comprises an MAC address of the access point and a block index corresponding to the block.

12. The method of claim 8, further comprising if the received checksum data is expired checksum data, retransmitting the request frame requesting the data of the block to an access point that previously sent the block.

13. A method of keeping information included in routing tables consistent throughout a wireless network, the method comprising:

receiving data of a block in a local association base (LAB) from a wireless network, the block comprising station information;

receiving local association base checksum (LABC) data corresponding to the block in the local association base (LAB) from the wireless network;

determining whether the data of the block in the local association base (LAB) has changed based on the received local association base checksum (LABC) data;

if the data of the block in the local association base (LAB) is determined to have changed, transmitting a request frame to an access point that previously generated and sent the original data of the block requesting the changed data of the block; and receiving the changed data of the block from the access point and storing the received data in a routing table, providing a hash function or a hash table necessary for generating the local association base checksum (LABC) data.

14. The method of claim 13, further comprising generating checksum data for the block after the storing of the received data in the routing table.

15. The method of claim 13, wherein the determining comprises determining whether the received data is identical to the checksum data generated for the block.

16. The method of claim 13, wherein the data of the block comprises MAC addresses and sequence numbers of a plurality of stations associated with the access point.

17. The method of claim 13, wherein the request frame comprises a MAC address of the access point and a block index corresponding to the block.

18. The method of claim 13, wherein the data of the block comprises MAC addresses and sequence numbers of a plurality of stations associated with the access point.

19. The method of claim 13, further comprising if the received checksum data is expired checksum data, retransmitting the request frame requesting the data of the block to an access point that previously sent the block.

20. An access point comprising:

a local association base (LAB) generation unit which gathers information about a plurality of stations associated with an access point and generates a LAB by classifying the information into a plurality of blocks;

a local association base checksum (LABC) generation unit which generates a LABC by generating checksum data for each of the blocks;

a hash unit which provides a hash function or a hash table necessary for generating the checksum data; and a transmission unit which transmits the LAB or the LABC.

21. The access point of claim 20, wherein the information comprises MAC addresses and sequence numbers of the plurality of stations associated with the mesh access point.

22. The access point of claim 20, wherein the checksum is obtained using a hash function or a hash table.

23. The access point of claim 20, wherein the transmission unit transmits the LAB or the LABC at regular time intervals.

24. The access point of claim 20, wherein, if a station associated with the access point is associated with the access point or if one of the stations of the plurality of stations currently associated with the access point is disassociated from the access point, the LAB generation unit generates a LAB for a block related to the association or the disassociation.

25. A wireless network device comprising:

a reception unit which receives data of a block or checksum data corresponding to the block from a wireless network, the block comprising station information;

a global association base (GAB) generation unit which generates a GAB based on the received block data;

a hash unit which determines whether the received checksum data is identical to checksum data included in the generated GAB and corresponds to the block; and a routing table which comprises station association information obtained by the GAB generation unit.

26. The wireless network device of claim 25, wherein the GAB generation unit generates the GAB and checksum data for each of a plurality of blocks of the GAB.

27. The wireless network device of claim 25, wherein the data of the block comprises MAC addresses and sequence numbers of a plurality of stations associated with an access point.

28. The wireless network device of claim 25, further comprising a transmission unit which transmits a request frame to an access point requesting the data of the block if the received checksum data is not identical to the checksum data included in the generated GAB, wherein the request frame comprises an MAC address of the access point and a block index corresponding to the block.

29. The wireless network device of claim 28, wherein, if the received checksum data is expired checksum data, the transmission unit transmits a request frame to an access point that previously sent the block requesting the data of the block.

* * * * *